(12) United States Patent
Lin et al.

(10) Patent No.: US 8,225,911 B2
(45) Date of Patent: Jul. 24, 2012

(54) DISC BRAKE ASSEMBLY WITH SHIM PLATE

(75) Inventors: Jiashen Lin, Wheaton, IL (US); Steve Wang, Long Grove, IL (US); Abhimanyu Kumar, Ghaziabad (IN)

(73) Assignee: GRI Engineering & Development, LLC, Long Grove, IL (US)

( * ) Notice: Subject to any disclaimer, the term of this patent is extended or adjusted under 35 U.S.C. 154(b) by 818 days.

(21) Appl. No.: 12/247,348

(22) Filed: Oct. 8, 2008

(65) Prior Publication Data

US 2010/0084227 A1 Apr. 8, 2010

(51) Int. Cl.
*F16D 65/38* (2006.01)

(52) U.S. Cl. .............. 188/73.37; 188/73.36; 188/250 E; 188/250 G

(58) Field of Classification Search ............... 188/73.37, 188/73.36, 73.38, 73.31, 250 B, 250 E, 250 G
See application file for complete search history.

(56) References Cited

U.S. PATENT DOCUMENTS

| | | | |
|---|---|---|---|
| 4,836,339 A | 6/1989 | Kobayashi et al. | |
| 4,846,312 A | 7/1989 | Sweetmore et al. | |
| 5,509,508 A * | 4/1996 | Evans | 188/73.38 |
| 5,535,858 A | 7/1996 | Hummel et al. | |
| 5,538,104 A | 7/1996 | Katz et al. | |
| 6,913,120 B2 | 7/2005 | Bosco et al. | |
| 6,955,247 B2 * | 10/2005 | Renauld | 188/73.37 |
| 7,097,008 B2 | 8/2006 | Pham et al. | |
| 7,370,736 B2 * | 5/2008 | Anda et al. | 188/73.36 |
| 7,568,561 B2 * | 8/2009 | Bosco, Jr. | 188/250 B |
| 7,726,450 B2 * | 6/2010 | Bosco, Jr. | 188/250 G |
| 7,731,004 B2 * | 6/2010 | Roehling | 188/250 B |
| 2004/0188190 A1 * | 9/2004 | Niwa et al. | 188/73.37 |

FOREIGN PATENT DOCUMENTS

JP 08240234 A * 9/1996

\* cited by examiner

*Primary Examiner* — Robert A Siconolfi
*Assistant Examiner* — Mariano Sy
(74) *Attorney, Agent, or Firm* — Greer, Burns & Crain, Ltd.

(57) ABSTRACT

A brake pad assembly is provided that includes a backing plate including a first surface, a second surface opposite to the first surface, and at least one opening. Also included are a friction material associated with the backing plate and a shim plate having a first shim surface and a second shim surface, and a tab projecting from the second shim surface. The shim plate is securely fastened to the backing plate by inserting the tab into the opening such that the friction material, when plastic, embeds the tab inside the opening by flowing through the opening, and subsequently hardens around the tab.

8 Claims, 2 Drawing Sheets

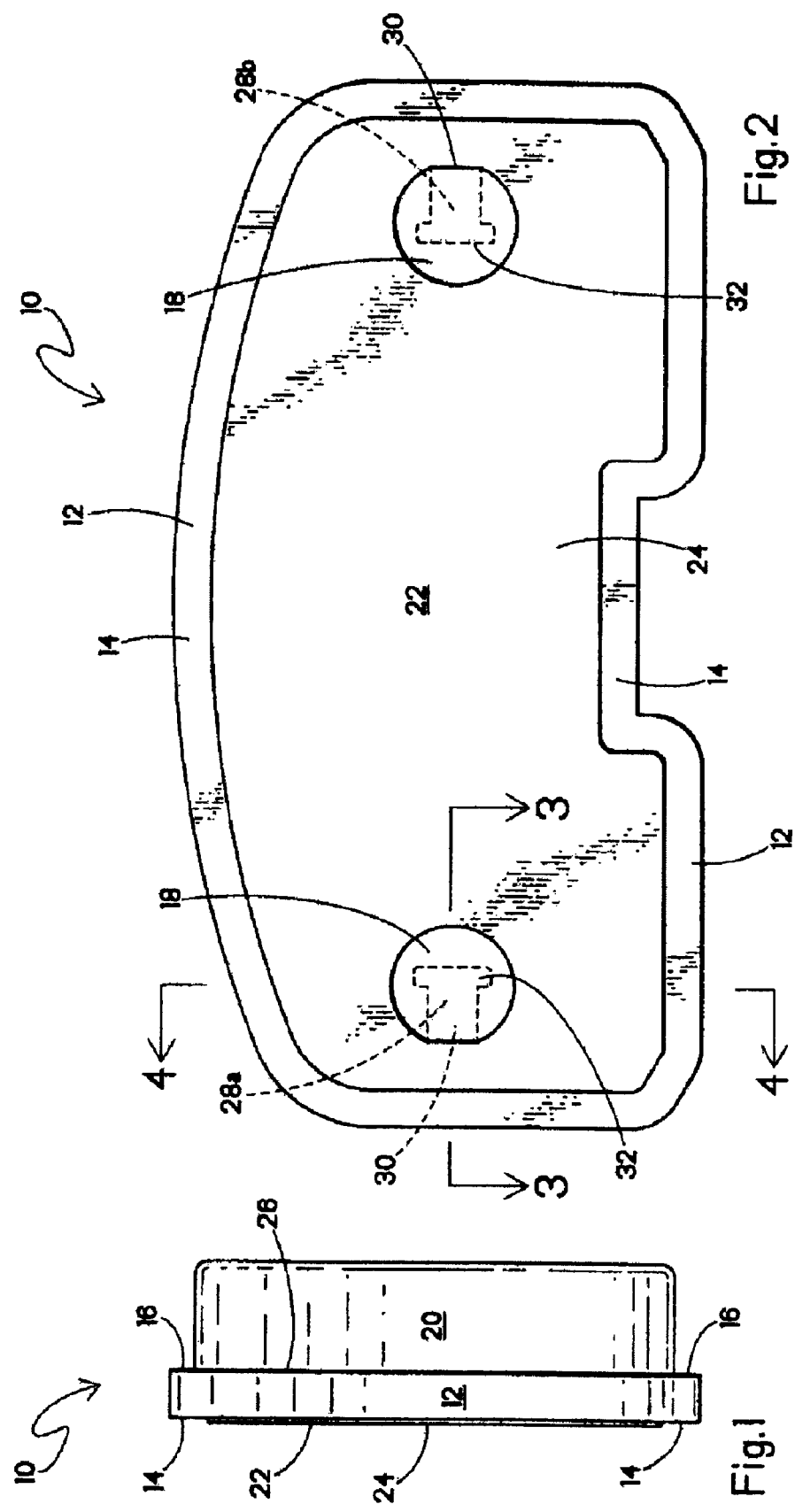

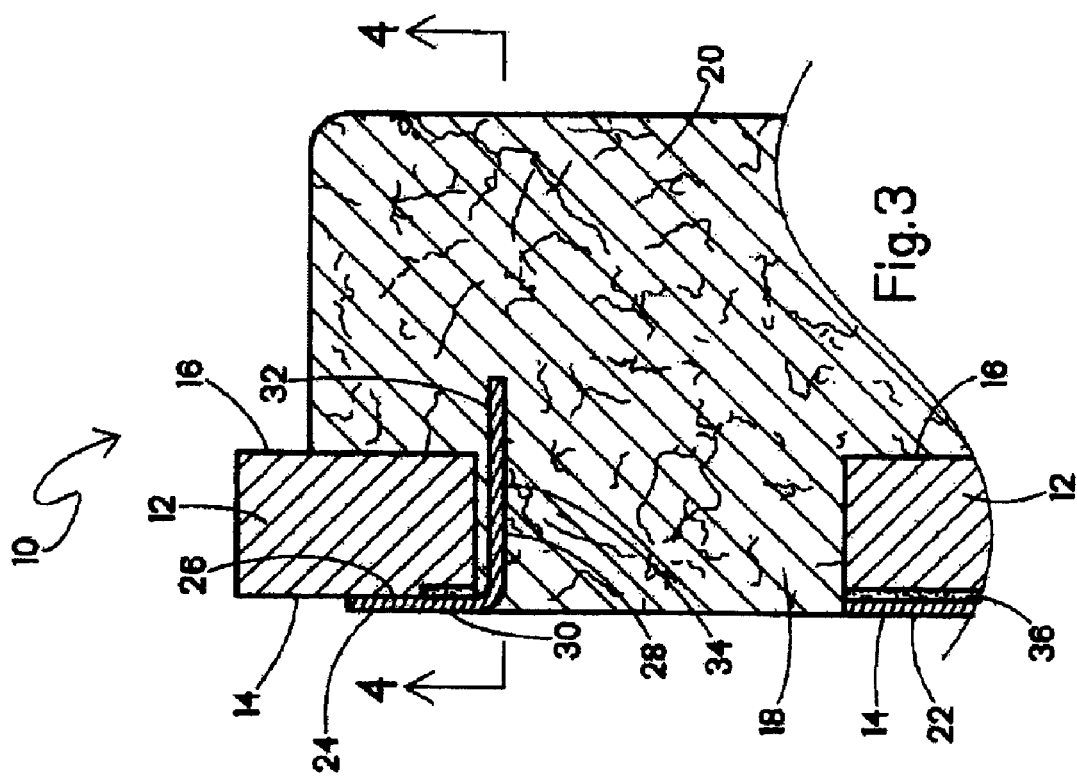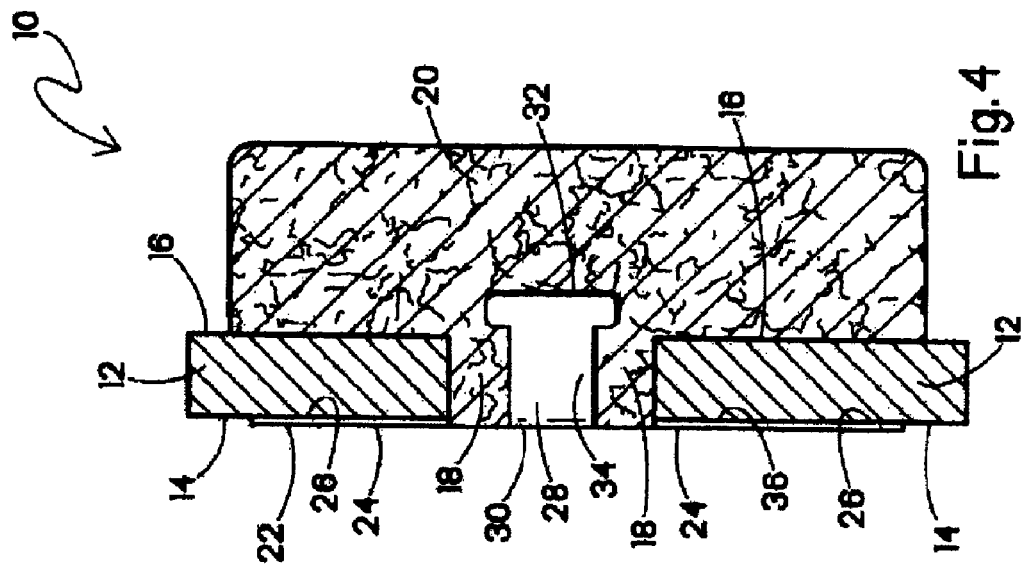

DISC BRAKE ASSEMBLY WITH SHIM PLATE

BACKGROUND OF THE INVENTION

This invention relates generally to disc brake pads, and particularly to disc brake pads which are provided with a shim plate.

In a brake assembly, such as a disc brake assembly, a rotatable disc or rotor rotates with a wheel to be braked. Braking subassemblies, including brake pads, have a steel backing plate and a braking pad, and are disposed on opposite sides of the disc. As the subassemblies move inwardly under the force supplied by an actuated piston and a related caliper, inner surfaces of the braking pads are engaged in frictional, braking contact with the rotor. A high pitched and undesired squeal noise is often produced by vibration of the subassemblies during braking.

To reduce or to eliminate the undesired brake squeal noise, sound (or noise) dampening members, commonly referred to as shims, have been used by both original equipment manufacturers and by brake repair shops. Initially, only adhesives were used to attach the shim plate to the backing plate. However, one problem with the use of adhesives is they are subject to failure under very heavy duty use where the brake pad can reach extremely high temperatures. Consequently, the shim is liable to slip relative to the pad, and in some cases has been known to fall out of the caliper or cause damage.

Several embodiments exist in the art that are designed to further reduce shifting of the shim during braking. For example, a previous brake pad assembly provides for a disc brake pad and shim assembly including a backing plate and friction material on the opposite side of the backing plate. The backing plate has at least one recess through which projections of the shim plate extend to hold the shim plate in place.

In another prior brake pad assembly, the backing plate has incompletely filled spigot holes, and a shim has protrusions extending into the unfilled region of the spigot holes. This configuration prevents slippage of the shim across the backing plate.

In yet another brake pad assembly, rivet-like projections on the backing plate engage openings in the shim plate. The projections are then deformed once the shim plate is in place to hold the shim plate to the backing plate.

SUMMARY OF THE INVENTION

The present brake pad assembly addresses the drawbacks of conventional brake pads. Specifically, the present brake pad assembly utilizes a back plate, a friction lining secured to one side of the back plate, and a generally planar shim plate securely fastened to the backing plate. An important feature of the present brake pad assembly is that the brake pad friction material is used to secure the shim in place despite the fact that the shim and pad are on opposite sides of the backing plate. Another feature of the present brake pad is that upon assembly, the shim becomes an integral part of the present brake pad.

More specifically, a brake pad assembly is provided that includes a backing plate including a first surface, a second surface opposite to the first surface, and least one opening. Also included is a friction material associated with the backing plate, a shim plate having a first shim surface and a second shim surface, and a tab projecting from the second shim surface. The shim plate is securely fastened to the backing plate by inserting the tab into the opening such that the friction material, when plastic, embeds the tab inside the opening by flowing through the opening, and subsequently hardens around the tab.

Another embodiment provides a shim plate for use with a brake pad assembly including a backing plate having an at least one opening and a friction material secured to the backing plate. The shim plate includes a first surface, a second surface opposite to the first surface, and at least one "T"-shaped tab projecting from the second surface. In this configuration, the shim plate is integrally joined to the backing plate by the tab being inserted into the at least one opening and being embedded in the friction material while the friction material is plastic.

Also included is a method for securing a shim plate against a backing plate where the backing plate includes at least a first aperture, and a first surface and a second surface, and the shim plate includes a first shim surface and a second shim surface opposite to the first surface. First, a "T"-shaped tab is stamped to the shim plate. The tab is then bent so that it is generally perpendicular to the second surface of the shim plate. Next, the second shim surface is coupled against the first surface of the backing plate and the first aperture is aligned with the tab such that the tab extends through the aperture. The tab is then embedded to the backing plate by having a friction material flow through the aperture so that the friction material hardens around the tab and integrally joins the shim plate to the backing plate.

BRIEF DESCRIPTION OF THE DRAWINGS

FIG. 1 is a side elevation view of the present brake pad assembly;

FIG. 2 is a front view of the present brake pad assembly;

FIG. 3 is a partial section taken along the line 3-3 of FIG. 2 and in the direction indicated generally; and FIG. 4 is a sectional view of the present brake pad assembly taken along the line 4-4 of FIG. 2 and in the direction indicated generally.

DETAILED DESCRIPTION OF THE EMBODIMENT

Referring now to FIGS. 1-4, a brake pad assembly incorporating the present invention is generally designated 10 and includes a backing plate 12 having a first surface 14 and a second surface 16 opposite the first surface. In the present application, the first and second surfaces 14, 16 are considered interchangeable. The backing plate 12 includes at least one opening 18, and preferably a pair of such openings which extend from the first surface 14 to the second surface 16. These openings 18 may vary in number and arrangement to suit the situation. In this embodiment, the opening 18 is substantially round or cylindrical, however other configurations for the shape of the opening 18 are suitable. As is well known in the art, the backing plate 12 of the disk brake assembly 10 will normally be a rigid metal plate made of steel, stainless steel, or the like. However, other suitable materials are contemplated.

A friction material 20 is mounted onto the second surface 16 of the backing plate 12. Mounting of the friction material 20 is typically performed by molding it on the second surface 16 using conventional methods known in the art. In a preferred embodiment, the friction material 20 is flowable or plastic during application to the backing plate. Once in place, the friction material 20 sets or hardens. Additionally, friction material 20 may be any of the well-known types of compositions used for disc brake pads, such as those composed of fibers, fillers, thermoset polymeric binder and various additives used as friction and wear modifiers.

Each brake pad assembly 10 also has a shim plate 22 attached to the first surface 14 of the backing plate 12. Thus, the shim plate 22 is disposed on an opposite side of the backing plate 12 from the friction material 20. The shim plate 22 is generally planar and includes a first shim surface 24 and a second shim surface 26 opposite the first shim surface. Additionally, the shim plate 22 may be made from the usual types of materials such that it can be bonded to the backing plate by means of an adhesive in the usual manner. Further, materials such as low carbon steel are considered suitable for the shim plate 22, and, more specifically, material such as AISI 1012 is preferred.

As illustrated in FIGS. 1-4, the shim plate 22 is secured to the first surface 14 of the backing plate 12 using at least one tab 28. Each tab 28 is integrally connected to the shim plate 22, as by being stamped from a press as known in the manufacturing art. As should be appreciated, the present embodiment requires at least one tab 28 to provide stability in mounting the shim plate 22 to the backing plate 12. More than one tab 28 can be used, however, depending on the desired design and application of the brake pad assembly 10. In fact, as shown in FIG. 2, in the preferred embodiment, two tabs 28a, 28b are used (the tabs are shown in phantom in their position prior to being bent). The number and arrangement of the tabs 28 may vary to suit the application.

The location of each tab 28 on the shim plate 22 is provided so that the shim plate is engageable with the first surface 14 of the backing plate 12. As can be seen in FIGS. 2-4, the position of each tab 28 is respectively aligned with its associated opening 18 when the shim plate 22 is coupled against the first surface 14 of the backing plate 12. Further, in this embodiment, the tab 28 is located approximately midway between upper and lower edges of the shim plate 22 as shown in FIG. 4.

Each tab 28 includes a first end 30 and a free end 32. The first end 30 of the tab 28 is integrated into the shim plate 22. At the first end 30 of the tab 28, the tab is bent and protrudes or projects away from the second surface 26 of the planar shim plate 22. As shown in FIGS. 3-4, upon completion of the fabrication of the shim plate 22, the tab 28 is generally perpendicular to the shim plate. Preferably, the free end 32 of the tab 28 laterally protrudes from a main body 34 of the tab to form a "T"-shape.

Turning now to FIGS. 3-4, upon assembly, it can be seen that the tab 28 is inserted through the backing plate 12 so that the free end 32 of the tab 28 extends through the opening 18 in the backing plate 12 and projects past the second surface 16. During the molding of the friction material 20 onto the second surface 16 of the backing plate 12, the plastic friction material flows through the opening 18 in the backing plate 12 and surrounds the tab 28. Specifically, a main body portion 34 of the tab 28, as well as the free end 32 are surrounded by the friction material 20. At this time, the friction material 20 is plastic in the sense that it is capable of being shaped or formed. Once the friction material 20 hardens, the tab 28 is firmly embedded in the friction material 20. Accordingly, the shim plate 22 is securely attached to the backing plate 12. It is contemplated that the "T"-shape of the tab 28 facilitates retention in the plastic friction material 20.

Importantly, the friction material 20 flows through the opening 18 so that the tab 28 is totally embedded in the friction material 20. Further, the friction material 20 extends through the opening 18 to a point where the first end 30 of the tab 28 meets the shim plate 22.

As indicated above, the method of securing the shim plate 22 to the second surface 16 of the backing plate 12 is also a feature of the present invention. Now referring to FIGS. 1-4, in this embodiment, the method includes the step of applying an adhesive 36 (FIG. 3) to either the second shim surface 26 or the first surface 14 of the backing plate 12 or both. The method also includes stamping the tab 28 from the shim plate 22 such that the tab is integrally attached to the shim plate as is shown. Stamping can also be used to attach additional tabs 28a, 28b, such as shown in FIG. 2, if desired or warranted. Importantly, the position of the tab 28 is preferably aligned with the opening 18. Either the position of the tab 28 dictates at least in part the position of the opening 18 or the position of the opening 18 dictates at least in part the position of the tab 28. On this point, it should be well understood that neither the formation of the shim 22 nor the formation of the backing plate 12 needs to occur simultaneously or in any particular order.

The present method of securing the shim plate 22 further contemplates bending the first end 30 of the tab 28 so that the opposite end 32 of the tab 28 projects away from the second shim surface 26 of the shim plate 22. After the tab 28 is bent, the opposite end 32 of the tab 28 is generally perpendicular to the generally planar shim plate 22.

The method also includes the step of coupling the shim 22 against the first surface 14 of the backing plate 12 and the respective tab 28 aligning with the respective opening 18 in the backing plate 12 such that the tab 28 extends through the opening 18.

The final step of the preferred method is to embed the tab 28 inside the opening 18 by having the friction material 20 flow through the opening 18 so that the friction material 20 hardens around the tab 28.

While a particular embodiment of the present brake pad assembly with shim plate has been shown and described, it will be appreciated by those skilled in the art that changes and modifications may be made thereto without departing from the invention in its broader aspects and as set forth in the following claims.

What is claimed is:

1. A brake pad assembly comprising:
   a backing plate including a first surface, a second surface opposite said first surface, and at least one opening;
   a friction material associated with said backing plate; and
   a shim plate including a first shim surface, a second shim surface, and a tab projecting from said second shim surface;
   wherein said tab is planar and is T-shaped with arms extending in a spaced parallel relationship to a plane defined by said shim plate, and
   wherein said shim plate is securely fastened to said backing plate by inserting said tab into said opening such that said tab projects beyond said second surface and said friction material, when flowable, embeds said tab inside said opening by flowing through said opening and filling a space between the tab arms and said plane of said shim plate, and subsequently hardens around said tab.

2. The brake pad assembly of claim 1, wherein said tab has a first end integrated with said shim plate and an opposite, free end embedded in said friction material and said tab is bent approximately perpendicular to said shim plate at said first end.

3. The brake pad assembly of claim 1, wherein said friction material extends to a point where said first end meets said shim plate and totally embeds said tab.

4. The brake pad assembly of claim 1, wherein said shim plate is made of low carbon steel.

5. The brake pad assembly of claim 1, wherein said at least one opening of said backing plate is substantially round.

6. A shim plate for use with a brake pad assembly including a backing plate having a thickness and at least one opening, and a friction material secured to the backing plate, comprising:
- a first surface;
- a second surface opposite said first surface; and
- at least one planar "T"-shaped tab projecting from said second surface with arms extending in a spaced parallel relationship to a plane defined by said second surface;
- wherein said shim plate is integrally joined to the backing plate by said tab being inserted into the at least one opening so that said tab extends beyond the thickness of the backing plate, and being embedded in the friction material while flowable.

7. The shim plate of claim 6, wherein said tab has a first end integrated with said shim plate and an opposite, free end embedded in said friction material, and said tab is bent approximately perpendicular at said first end.

8. A method of securing a shim plate against a backing plate, wherein said backing plate includes at least a first aperture, and a first surface and a second surface with a thickness in between said first and second surfaces, and said shim plate includes a first shim surface and a second shim surface opposite said first surface, wherein the method comprises the steps of:
- stamping a "T"-shaped tab to said shim plate;
- bending said tab so that said tab is planar, is generally perpendicular to said second surface of said shim plate, and has arms extending in a spaced parallel relationship to a plane defined by said shim plate;
- coupling said second shim surface against said first surface of said backing plate and aligning said first aperture with said tab such that said tab extends through said aperture beyond the thickness of the backing plate;
- embedding said tab to said backing plate by having a friction material flow through said aperture and fill a space between the tab arms and said plane of said shim plate;
- whereby said friction material hardens around said tab and integrally joins said shim plate to said backing plate.

\* \* \* \* \*